United States Patent
Livermore-Hardy et al.

(10) Patent No.: US 9,534,637 B2
(45) Date of Patent: Jan. 3, 2017

(54) TRAILING EDGE COOLING ON HYDRODYNAMIC BEARINGS

(71) Applicant: Waukesha Bearings Corporation, Pewaukee, WI (US)

(72) Inventors: Richard Livermore-Hardy, Hunton Bridge (GB); Barry Blair, Oconomowoc, WI (US)

(73) Assignee: WAUKESHA BEARINGS CORPORATION, Pewaukee, WI (US)

( * ) Notice: Subject to any disclaimer, the term of this patent is extended or adjusted under 35 U.S.C. 154(b) by 0 days.

(21) Appl. No.: 14/210,339

(22) Filed: Mar. 13, 2014

(65) Prior Publication Data

US 2014/0270607 A1    Sep. 18, 2014

Related U.S. Application Data

(60) Provisional application No. 61/779,025, filed on Mar. 13, 2013.

(51) Int. Cl.

| F16C 32/06 | (2006.01) |
|---|---|
| F16C 37/00 | (2006.01) |
| F16C 17/03 | (2006.01) |
| F16C 33/10 | (2006.01) |

(52) U.S. Cl.
CPC ............. *F16C 37/002* (2013.01); *F16C 17/03* (2013.01); *F16C 33/108* (2013.01); *F16C 33/1085* (2013.01); *Y10T 29/49639* (2015.01)

(58) Field of Classification Search
CPC ..... F16C 17/03; F16C 33/108; F16C 33/1085; F16C 37/002
USPC .................................. 384/114, 117, 313–322
See application file for complete search history.

(56) References Cited

U.S. PATENT DOCUMENTS

| 4,291,926 A | 9/1981 | Tomioka et al. |
|---|---|---|
| 5,288,153 A * | 2/1994 | Gardner ........................ 384/311 |
| 5,738,447 A | 4/1998 | Nicholas |
| 6,485,182 B2 | 11/2002 | Nicholas |
| 8,366,323 B2 | 2/2013 | Waki et al. |
| 2008/0013872 A1* | 1/2008 | Geiger ........................... 384/309 |
| 2010/0142870 A1 | 6/2010 | Waki et al. |

FOREIGN PATENT DOCUMENTS

JP    9-32848    *    2/1997

OTHER PUBLICATIONS

International Search Report and Written Opinion for PCT/US2014/026833, dated Jul. 15, 2014.

* cited by examiner

*Primary Examiner* — James Pilkington
(74) *Attorney, Agent, or Firm* — Hamilton IP Law, PC; Jay R. Hamilton; Charles A. Damischen

(57) ABSTRACT

A trailing edge cooled bearing provides an illustrative embodiment of an apparatus for increasing heat transfer in various bearings, including but not limited to radial and axial tilting pad bearings. In the illustrative embodiment, the trailing edge cooled bearing may comprise at least one journal pad having a leading and trailing edge. The trailing edge may include a trailing edge face having one or more grooves formed therein. A spray bar may having one or more apertures formed therein may be positioned adjacent the trailing edge face to deliver fluid thereto.

20 Claims, 6 Drawing Sheets

ABSTRACT

TRAILING EDGE COOLING ON HYDRODYNAMIC BEARINGS

CROSS REFERENCE TO RELATED APPLICATIONS

The present application claims priority and the filing benefit of provisional U.S. Pat. App. No. 61/779,025 filed on Mar. 13, 2013, which is incorporated by reference herein in its entirety.

FIELD OF INVENTION

The present invention relates to bearings, and more specifically, to bearings with a cooling feature therein.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

Many types of bearings exist. Tilting pad journal bearings typically rely on a fluid film for adequate operation. However, the temperature of the fluid film and the temperature of the surface of the bearing in such bearings can greatly affect the performance of the bearing. Accordingly, individuals have attempted to cool a surface of the bearing that may be in direct contact with the fluid. For example, U.S. Pat. No. 6,485,182, which is incorporated by reference herein in its entirety, discloses a sleeve bearing with bypass cooling.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION

Figure 1:
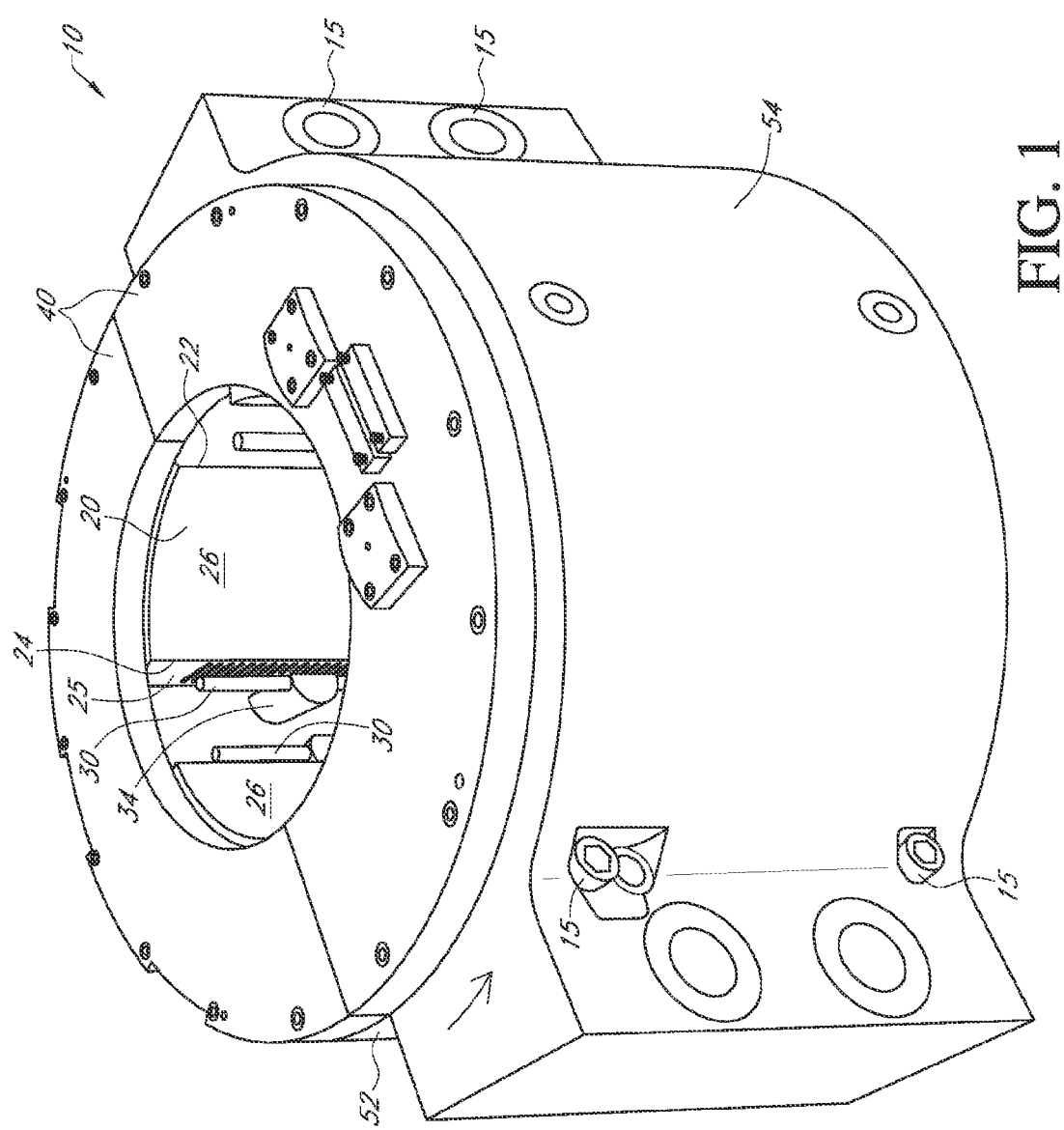
FIG. 1 provides a perspective view of an illustrative embodiment of a trailing edge cooled bearing.

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Referring now to the drawings, wherein like reference numerals designate identical or corresponding parts throughout the several views, FIG. 1 provides a perspective view of an illustrative embodiment of a trailing edge cooled bearing 10. As shown, the trailing edge cooled bearing 10 may include one or more pads 20 placed about a bore 14 formed in the trailing edge cooled bearing 10. In the illustrative embodiment pictured in FIG. 1, the pads 20 may be configured as journal pads 20, though the scope of the present disclosure is not so limited. Accordingly, the term "journal pad" as used herein when referring to pads 20 configured according to the present disclosure in no way limits the scope of the present disclosure to trailing edge cooled bearings 10 having journal pads. Although the illustrative embodiment shown in FIG. 1 is directed primarily to a tilting pad journal bearing, the trailing edge cooled bearing 10 as disclosed and claimed herein is not so limited, and extends to any bearing in which cooling may be required, including but not limited to tilting pad thrust or journal bearings, whether unidirectional or bi-directional.

When referring to the illustrative embodiment of a trailing edge cooled bearing 10 shown in FIG. 1, each journal pad 20 may include a leading edge 22 and a trailing edge 24, the differentiation of which may depend at least upon the direction of rotation of the rotational body (e.g., a shaft) that interfaces with the trailing edge cooled bearing 10. In FIG. 1, for illustrative purposes the reference for rotational direction is counterclockwise, such that the left side of the two visible journal pads 20 comprises their trailing edges 24 and the right sides comprise their leading edges 22. Oftentimes the thinnest fluid film and the highest temperatures in bearings such as those pictured in FIG. 1 are experienced at the trailing edge 24 of the journal pad 20.

Figure 2:
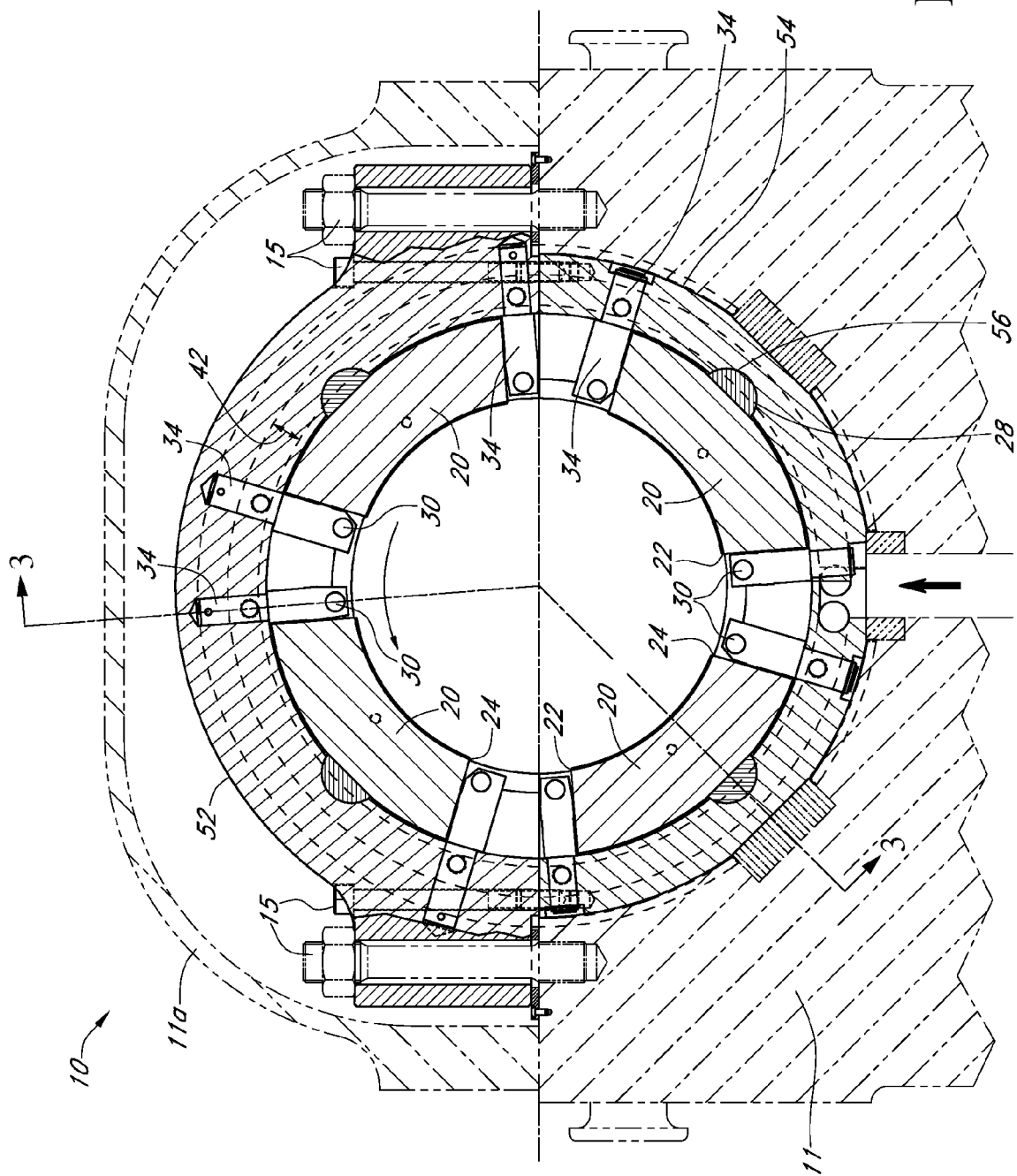
FIG. 2 provides radial, cross-sectional view of the embodiment of a trailing edge cooled bearing shown in FIG. 1.
Figure 3:
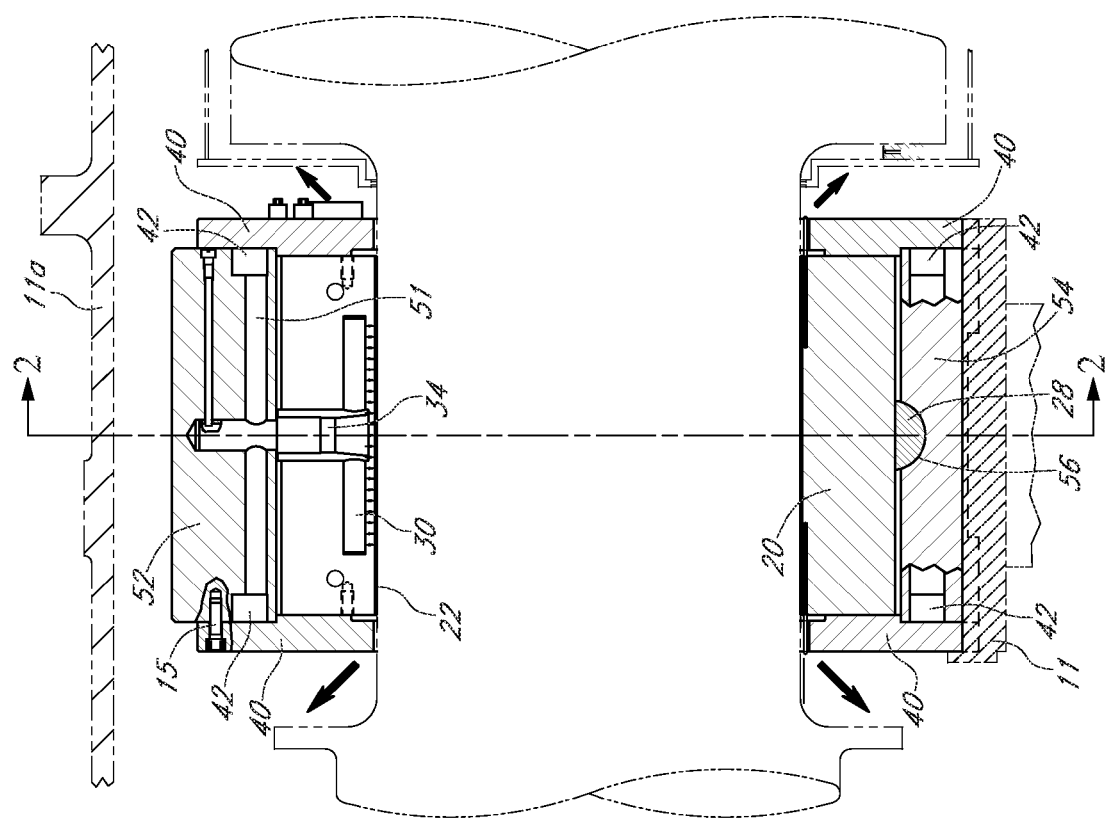
FIG. 3 provides a an axial, cross-sectional view of the embodiment of a trailing edge cooled bearing shown in FIG. 1.

An axial, cross-sectional view of the illustrative embodiment of a trailing edge cooled bearing 10 is shown in FIG. 2, and FIG. 3 provides a radial, cross-sectional view thereof. Referring specifically to FIG. 3, it will be appreciated that this embodiment of a trailing edge cooled bearing 10 is shown engaged with a machine housing 11 with a cap 11a positioned over the trailing edge cooled bearing 10. For reference purposes, the curved arrow in FIG. 2 indicates the direction of shaft rotation as being counterclockwise (as viewed from the left to the right side of the sectional view), which direction of rotation affects the definition of the leading and trailing edges 22, 24, which is discussed in further detail below. This illustrative embodiment may be configured as a two-piece design, wherein the trailing edge cooled bearing includes a main body 50 comprised of a top portion 52 and a bottom portion 54, which may be engaged with one another via one or more fasteners 15 and corresponding apertures (which may or may not be tapped) in the top and/or bottom portions 12a, 12b. In many applications, the bottom portion 54 may be engaged with a machine housing 11. Any suitable structure and/or method may be used to engage the trailing edge cooled bearing 10 with a machine and/or machine housing 11, including but not limited to mechanical fasteners (e.g., screws, bolts, etc.), interference fits, chemical adhesives, welding, and/or combinations thereof without limitation. Additionally, any suitable structure and/or method may be used to engage the top portion 52 with the bottom portion 54 of a main body 50, including but not limited to mechanical fasteners (e.g., screws, bolts, etc.), interference fits, chemical adhesives, welding, and/or combinations thereof without limitation.

In other embodiments, the trailing edge cooled bearing 10 may be configured as a single, integral structure, and in still other embodiments the trailing edge cooled bearing may be configured with more than two pieces. According, the scope of the present disclosure is not limited by the number of pieces used to construct the trailing edge cooled bearing 10 and extends embodiments thereof using a single, integral main body 50 and those embodiments using two or more pieces engaged with one another to form a main body 50 without limitation.

Referring now to FIG. 3, an end plate 40 may be positioned adjacent either axial face of the main body 50. Either end plate 40 may be engaged with the main body 50 via one or more fasteners 15 as shown in FIG. 3. However, any suitable structure and/or method may be used to engage an end plate 40 with the main body 50, including but not limited to mechanical fasteners (e.g., screws, bolts, etc.), interference fits, chemical adhesives, welding, and/or combinations thereof without limitation. Each end plate 40 may be configured such that the inner diameter thereof is positioned in relatively close proximity to the diameter of a shaft around which the trailing edge cooled bearing 10 may be positioned. It is contemplated that the clearance between the inner diameter of the end plate 40 and the diameter of the shaft may be selected such that lubricant may exit the trailing edge cooled bearing 10 at that point. For certain embodiments this clearance may be configured to 10 millimeters (mm) but in other embodiments this clearance will be greater than 10 mm, and in still other embodiments it will be less than 10 mm. Accordingly, the scope of the present disclosure is in no way limited by this clearance, and extends to all alternative configurations for allowing lubricant to exit the trailing edge cooled bearing 10 without limitation. As used herein, the terms "lubricant" and "fluid" may be used interchangeably and generally to any fluid that may be of beneficial use in any embodiment of a trailing edge cooled bearing 10.

The main body 50 and end plates 40 may be configured to form an annulus 42 on either side of the main body 50. The main body 50 may include one or more channels 51 formed therein, which for the illustrative embodiment of the trailing edge cooled bearing 10 shown in FIG. 2 may be oriented axially with respect to the rotational axis of a shaft around which the trailing edge cooled bearing 10 may be positioned. One or more of the channels 51 formed in the main body 50 may be in fluid communication with either annulus 42 formed adjacent either axial face of the main body 50.

One or more shanks 34 may be engaged with the main body 50 at various rotational positions along in the inside diameter thereof. In the illustrative embodiment of a trailing edge cooled bearing 10, two shanks 34 may be associated with each journal pad 20, such that a total of four journal pads 20 and eight shanks 34 may be included. However, in other embodiments of the trailing edge cooled bearing 10 not pictured herein, a different number of shanks 34 may be associated with each journal pad 34. Accordingly, the scope of the present disclosure is not limited in any way by the number of shanks 34 relative to the number of any other element of the trailing edge cooled bearing 10. Furthermore, the number, relative placement, and/or configuration of journal pads 20 may vary from one embodiment of the trailing edge cooled bearing 10 to the next, and some embodiments thereof may include six journal pads 20, eight journal pads 20, or an odd number of journal pads, without limitation. Accordingly, the scope of the present disclosure is not limited in any way by the number, orientation, and/or configuration of journal pads 20.

In the illustrative embodiment, one or more fasteners 15 (which may be axially oriented) may be used to engage and/or secure each shank 34 with the main body 50, as best shown in FIG. 2. However, any suitable structure and/or method may be used to engage and/or secure each shank 34 with the main body 50, including but not limited to mechanical fasteners (e.g., screws, bolts, etc.), interference fits, chemical adhesives, welding, and/or combinations thereof without limitation.

The proximal end of each shank 34 may be positioned within the main body 50 such that an interior pathway in the shank 34 may be in fluid communication with one or more of the channels 51 formed in the main body 50. A distal end of each shank may be engaged with a spray bar 30 such that an interior pathway in the spray bar 30 may be in fluid communication with the interior pathway in the shank 34. As such, lubricant (which may be pressurized using any lubricant supply method and/or apparatus suitable for the particular application of the trailing edge cooled bearing 10) may be supplied to an annulus 42 and/or channel 51 in the main body 50, which lubricant may pass through the interior of a shank 34 and to a spray bar 30 engaged with that shank 34. Other methods and/or apparatuses may be used to supply lubricant and/or fluid to the spray bar 30 without limitation, and that shown and described herein is for illustrative purposes only, and is not meant to limit the scope of the present disclosure.

A plurality of journal pads 20 may be spaced about the inner diameter of the main body 50 at various positions. Again, the illustrative embodiment of the trailing edge cooled bearing 10 may include four journal pads 20 equally spaced about the main body 50, but the scope of the present disclosure is not so limited, and the number, relative placement, orientation, and/or configuration of journal pads 20 may vary from one embodiment of the trailing edge cooled bearing 10 to the next without limitation.

In the illustrative embodiment, each journal pad 20 may be engaged with the main housing 50 via a ball-and-socket configuration. In such an embodiment, the journal pad 20 may be formed with a ball 28 on the circumferentially exterior surface thereof, wherein that ball 28 corresponds to a socket 56 formed in the main body 50. This configuration allows the journal pads 20 to move and/or tilt with respect to the main body 50. However, other embodiments of the trailing edge cooled bearing 10 use other features to allow for journal pad 20 movement and/or tilting with respect to the main body (e.g., axial ridges formed in the main body 50 that engage the journal pad 20). Accordingly, the scope of the present disclosure is in no way limited by the method and/or structure used to allow relative movement and/or tilting between the main body 50 and any journal pad 20.

Figure 4:
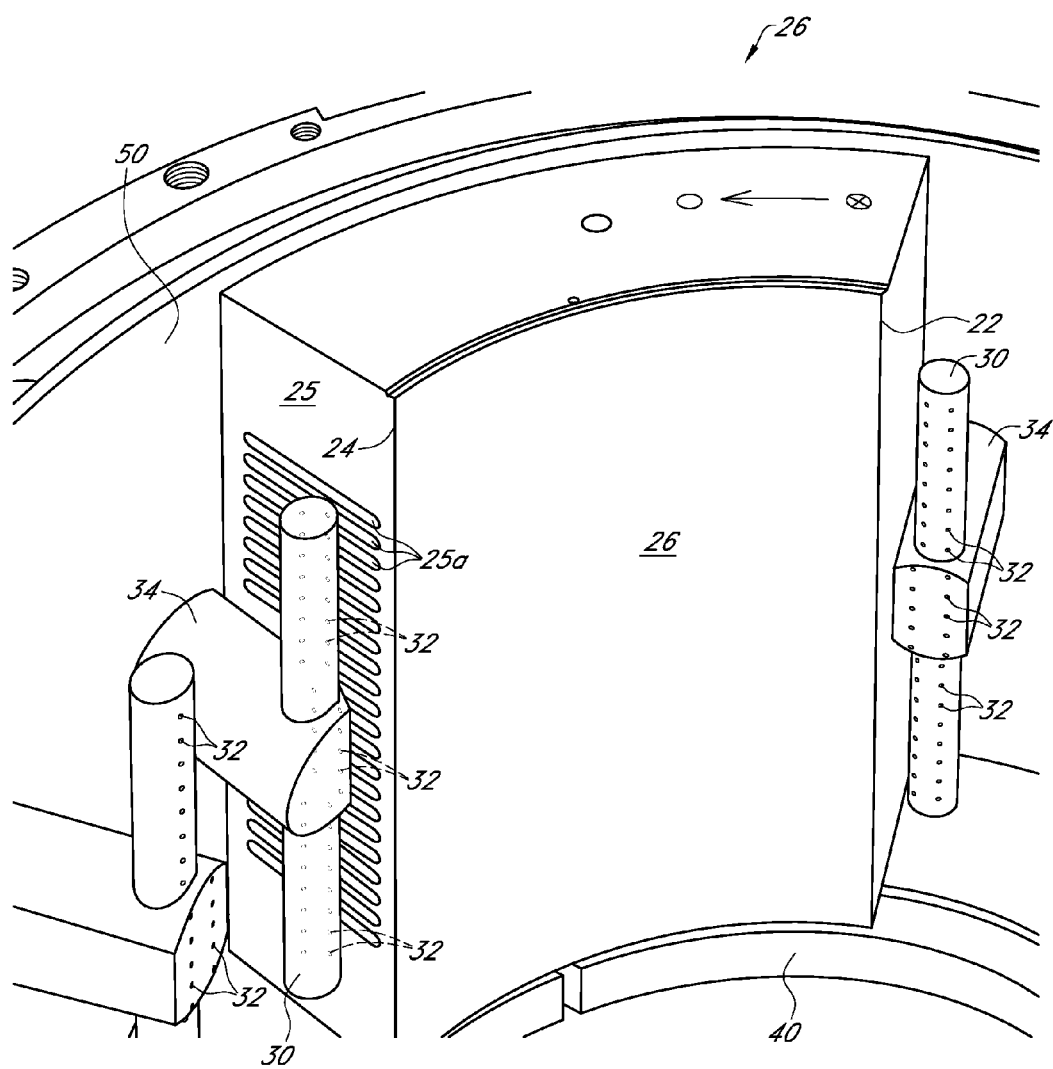
FIG. 4 provides a detailed, perspective view of a portion of the embodiment shown in FIG. 1 adjacent a journal pad.

A spray bar 30 may be positioned adjacent the trailing edge 24 of the journal pad 20, which is shown in FIG. 1 and in greater detail in FIG. 4. A spray bar 30 may also be positioned on the leading edge 22 of the journal pad 20. In the illustrative embodiment, the spray bar 30 shown at the top portion of FIG. 2 may be configured to be positioned adjacent the leading edge 22 of a journal pad 20. As shown in FIG. 3 for the illustrative embodiment, the spray bars 30 positioned closest to the twelve, three, six, and nine o'clock positions may be configured such that they are positioned adjacent the leading edge 22 of a journal pad 20, and the remaining four spray bars 30 may be configured such that they are positioned adjacent the trailing edge 24 of a journal pad 30.

Either spray bar 30 may be engaged with a shank 34, which shank 34 may in turn be engaged with a main body 50 of the trailing edge cooled bearing 10 as previously described. The spray bar 30 adjacent the trailing edge 24 of the journal pad 20 may be configured to direct fluid toward the trailing edge 24 of the journal pad 20, and in certain embodiments directly toward the trailing edge face 25, as described in further detail below. Each spray bar 30 and/or shank 34 may be formed with one or more apertures 32 therein, which apertures 32 may be configured to direct fluid flow from the interior pathway in the spray bar 30 and/or shank 34 outward in a specific direction or directions and with specific fluid flow characteristics (e.g., velocity, volumetric flow rate, etc.) with a known pressure drop across apertures 32. In certain embodiments, the spray bar 30 and/or shank 34 positioned adjacent the leading edge 22 of a journal pad 20 may be configured with two sets of apertures 32, wherein a first set of apertures 32 may be configured to remove existing lubricant from the shaft and a second set of apertures 32 may be configured to provide fresh lubricant to the active surface 26 and/or the shaft. However, other embodiments of the trailing edge cooled bearing 10 may have different configurations of apertures 32 in any spray bar 30 and/or shank 34 without limitation. For example, the illustrative embodiment of a trailing edge cooled bearing 10 shows the spray bar 30 associated with the leading edge 22 and the spray bar 30 associated with the trailing edge 24 as separate elements. However, in other embodiments of the trailing edge cooled bearing 10 not pictured herein, a plurality of apertures 32 in one single spray bar 30 may be configured to provide any of the functionality and/or additional functionality as the spray bars 30 and configuration of apertures therein disclosed herein. That is, a single spray bar 30 and/or apertures 32 therein (and/or shank 34 and/or apertures 32 therein) may be configured to direct fluid flow to the shaft, leading edge 22, trailing edge 24, trailing edge face 25, and/or combinations thereof without limitation.

Figure 5A:
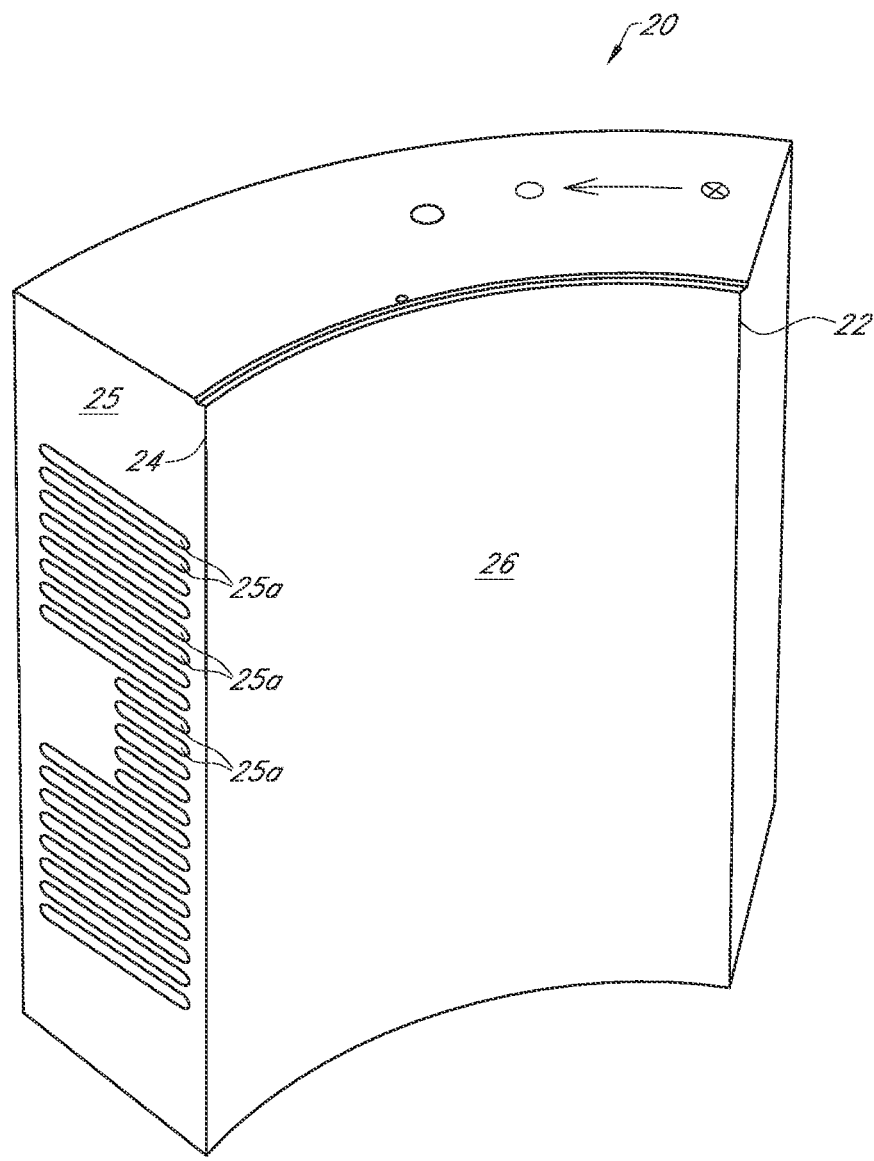
FIG. 5A provides perspective view of an illustrative embodiment of a journal pad that may be used with various embodiments of the trailed edge cooled bearing.
Figure 5B:
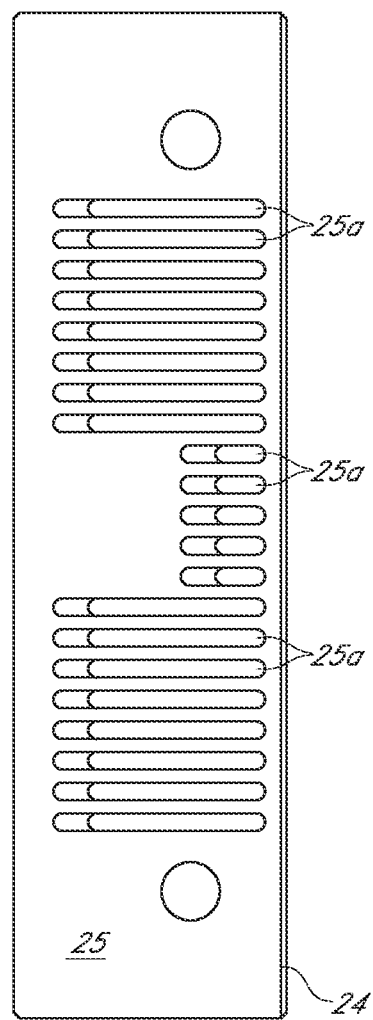
FIG. 5B provides a detailed view of one embodiment of a trailing edge face that may be used with various embodiments of a journal pad.

A detailed perspective view of an illustrative embodiment of a journal pad 20 that may be used with a cooled bearing 10 is shown in FIG. 5A, and an illustrative embodiment of one configuration of grooves 25a on the trailing edge face 25 is shown in detail in FIG. 5B. In FIG. 5A, the reference for rotational direction for a shaft is shown by the arrow on the journal pad 20, such that the right side of the journal pad 20 comprises the leading edge 22 and the left side comprises the trailing edge 24. The journal pad 20 may include a leading 22 and trailing edge 24 as previously described. Additionally, the journal pad 20 may include one or more profiles (not shown) on an active surface 26 of the journal pad 20. A lubricant pathway (not shown) may be (or may not be, depending on the specific embodiment of the trailing edge cooled bearing) formed in an interior portion of the journal pad 20 to direct lubricant to the active surface 26 and/or profiles formed therein under certain operating conditions. However, the scope of the present disclosure is in no way limited by the number, configuration, and/or orientation of any profiles and/or lubricant pathways in any journal pad 20 used in the trailing edge cooled bearing 10. Additionally, one or more journal pads 20 may be formed with bores configured to accommodate a respective temperature sensor. However, the presence or absence of such bores and/or respective temperature sensors in no way limits the scope of the present disclosure, and the trailing edge cooled bearing 10 as disclosed and claimed herein extends to both journal pads 20 having temperature sensors and those without temperature sensors.

As shown, the trailing edge face 25 may be formed with one or more grooves 25a thereon. The grooves 25a may be adjacent a spray bar 30 having a plurality of apertures 32 formed along the length thereof, embodiments of which were previously described in detail above. In certain embodiments, the apertures 32 in each spray bar 30 adjacent the trailing edge face 25 may be aligned with the grooves 25a such that one aperture 32 corresponds to one groove 25a in the trailing edge face 25 and provides fluid directly to that corresponding groove 25a. These spray bars 30 and/or apertures 32 formed therein (or formed in the shank 34) may be configured to increase the velocity of lubricant impinging into the grooves in order to increase the rate and/or quantity of heat transfer between the lubricant and the journal pad 20.

The grooves 25a may serve to increase the surface area on which the lubricant may act to exchange thermal energy with the pad 20. Generally, deeper grooves 25a provide more surface area for heat exchange. However, removing material from that portion of the journal pad 20 may compromise the stiffness and/or structural integrity of the journal pad 20. Accordingly, the optimal configuration for the grooves 25a will vary from one embodiment of the trailing edge cooled bearing 10, and the optimal configuration may involve balancing the desired heat transfer with the desired structural integrity and/or resistance to deflection of a journal pad 20. Therefore, the specific number, orientation, relative position, shape, geometry, dimensions, configuration, etc. of a groove 25a or grooves 25a may vary from one embodiment of the cooled bearing 10 to the next, and is in no way limiting to the scope of the present disclosure. Additionally, the grooves 25a formed in any given trailing edge face 25 need not be identical and/or uniform. The spray bar 30, shank 34, and/or the arrangement of apertures 32 thereon may be configured to efficiently deliver fluid to the grooves 25a such that the desired amount of heat transfer is achieved for a given fluid velocity passing over the groove 25a configuration (e.g., via different spray patterns, etc.).

Even though the specific number, orientation, relative position, shape, geometry, dimensions, configuration, etc. of the trailing edge cooled bearing and various elements thereof may vary from one embodiment of the cooled bearing 10 to the next, one specific illustrative embodiment will be described, wherein the listed dimensions are for illustrative purposes only. For a shaft having an outside diameter of approximately 580 millimeters (mm), the outside diameter of each end plate 40 may be 1000 mm, and the inside diameter thereof may be 590 mm. The axial width of the main body 50 may be 493 mm and the axial width of each end plate 40 may be 40 mm. The outside diameter of the main body 50 may be 1100 mm.

The clearance between the active surface 26 of each journal pad 20 and the shaft may be 0.05 mm. Each journal pad 20 may be 200 mm thick in the radial dimension and encompass an arc of 20 to 90 degrees based on the rotational axis of the shaft. The axial dimension of each journal pad 20 may be 520 mm, which in conjunction with the thickness of each journal pad 20 may determine with surface area of the trailing edge face 25.

A total of 16 long grooves 25a having a length of 96 mm may be configured in two groups of eight long grooves 25a, wherein the top surface of each long groove 25a may be positioned 20 mm from the active surface 26. Five short grooves 25a having a length of 27 mm may be positioned between the two groups of long grooves 25a, wherein all the grooves 25a are equally spaced about the centerline of the trailing edge face 25. All grooves 25a may have a width of 6 mm and a depth of 15 mm, and all adjacent grooves 25a may be spaced from one another by 11 mm. Again, the foregoing dimensions are for illustrative purposes only, and in no way limit the scope of the present disclosure.

The number, configuration, dimensions, geometries, and/or relative locations of the journal pads 20, grooves 25a, spray bars 30, and/or apertures 32, will vary from one embodiment of the trailing edge cooled bearing 10 to the next, as will the optimal configuration thereof.

Accordingly, the trailing edge cooled bearing 10 as disclosed and claimed herein is in no way limited by the specific constraints of those elements.

The trailing edge cooled bearing 10 as disclosed and claimed herein may extend to any rotating machinery for which an increase in heat transfer is desired, and is in no way limited to the specific embodiments pictured and/or described herein. The optimal number, dimensions, geometries, relative placement, shapes, and/or configuration of journal pads 20, grooves 25a, spray bars 30, apertures 32, and/or any other element of the trailing edge cooled bearing 10 will vary from one embodiment of the trailing edge cooled bearing 10 to the next, and are therefore in no way limiting to the scope thereof. The various elements of an apparatus using at least one feature of the present disclosure may be formed of any material that is suitable for the application for which the apparatus is used. Such materials include but are not limited to metals and their metal alloys (e.g., a copper alloy with chromium and zirconium, carbon steel, etc.), polymeric materials, and/or combinations thereof.

Although the specific embodiments pictured and described herein pertain to tilting pad journal bearings having an equal number of journal pads 20, the trailing edge cooled bearing 10 may be configured with other orientations and/or with different quantities of the various elements having different shapes and/or orientations, equally or unequally spaced from other elements of the trailing edge cooled bearing 10. Accordingly, the scope of the present disclosure is in no way limited by the specific shape, configuration, and/or dimensions of the above elements, and/or the relative quantities and/or positions thereof.

Having described the preferred embodiments, other features, advantages, and/or efficiencies of the present disclosure will undoubtedly occur to those versed in the art, as will numerous modifications and alterations of the disclosed embodiments and methods, all of which may be achieved without departing from the spirit and scope of the present disclosure as disclosed and claimed herein. Furthermore, variations and modifications of the foregoing are within the scope of the trailing edge cooled bearing 10. It is understood that the scope of the trailing edge cooled bearing 10 as disclosed herein extends to all alternative combinations of one or more of the individual features mentioned or evident from the text and/or drawings. All of these different combinations constitute various alternative aspects of the trailing edge cooled bearing 10. The embodiments described herein explain the best modes known for practicing the trailing edge cooled bearing 10 and will enable others skilled in the art to utilize the same. The claims are to be construed to include alternative embodiments to the extent permitted by the prior art.

It should be noted that the present disclosure is not limited to the specific embodiments pictured and described herein, but are intended to apply to all similar apparatuses for increasing the rate and/or amount of heat exchange. Modifications and alterations from the described embodiments will occur to those skilled in the art without departure from the spirit and scope of the present disclosure.

The invention claimed is:

1. A trailing edge cooled bearing comprising:
   a. a main body having a channel formed therein;
   b. a first pad engaged with said main body, wherein said pad includes a leading edge, a trailing edge, and a trailing edge face, and wherein said first pad is moveable with respect to said main body in at least one dimension;
   c. a plurality of grooves formed in said trailing edge face; and,
   d. a spray bar engaged with said main body, wherein said spray bar is in fluid communication with said channel, wherein said spray bar is positioned adjacent said trailing edge face, wherein said spray bar includes an aperture directly facing at least one groove of said plurality of grooves in said trailing edge face, and wherein said aperture and said spray bar direct a fluid toward said plurality of grooves in said trailing edge face.

2. The bearing according to claim 1 wherein said first pad is further defined as a journal pad.

3. The bearing according to claim 1 wherein said main body further comprises a top portion and a bottom portion.

4. The bearing according to claim 1 further comprising a first end plate positioned adjacent a first axial face of said main body and a second end plate positioned adjacent a second axial face of said main body.

5. The bearing according to claim 4 wherein said first end plate and first axial face of said main body cooperate to form a first annulus, and wherein said second end plate and said second axial face of said main body cooperate to form a second annulus.

6. The bearing according to claim 5 wherein said first and second annuluses are further defined as being in fluid communication with said channel formed in said main body.

7. The bearing according to claim 1 further comprising a shank, wherein said shank is engaged with said main body and in fluid communication with both said channel in said main body and said spray bar.

8. The bearing according to claim 1 wherein said first pad is further defined as being engaged with said main body via a ball-and-socket arrangement.

9. The bearing according to claim 1 wherein said bearing further comprises a second, third, and fourth pad, and wherein said second, third, and fourth pads are equally spaced around a shaft that is rotatable with respect to said bearing, wherein each said pad includes a leading edge, a trailing edge, and a trailing edge face, wherein said trailing edge face of each said pad includes a plurality of grooves formed therein.

10. The bearing according to claim 9 further comprising a second, third, and fourth spray bar engaged with said main body, wherein each said spray bar includes a plurality of apertures formed therein, wherein each said spray bar is in fluid communication with said channel, wherein said second spray bar is configured to direct a fluid flow toward said plurality of grooves in said trailing edge face of said second pad, wherein said third spray bar is configured to direct a fluid flow toward said plurality of grooves in said trailing edge face of said third pad, and wherein said fourth spray bar is configured to direct a fluid flow toward said plurality of grooves in said trailing edge face of said fourth pad.

11. The bearing according to claim 10 further comprising a first, second, third, and fourth shank, wherein said first shank is engaged with said main body and in fluid communication with both said channel in said main body and said spray bar, wherein said second shank is engaged with said main body and in fluid communication with both said channel in said main body and said second spray bar, wherein said third shank is engaged with said main body and in fluid communication with both said channel in said main body and said third spray bar, and wherein said fourth shank is engaged with said main body and in fluid communication with both said channel in said main body and said fourth spray bar.

12. The bearing according to claim 11 wherein said bearing is further defined as a journal pad bearing, wherein said pad further comprises an active surface having an inner circumferential surface with a radius corresponding to a radius of said shaft.

13. The bearing according to claim 1 wherein said bearing further comprises a second, third, and fourth pad, and wherein said second, third, and fourth pads are equally spaced around said main body, wherein said main body is positioned around a shaft that is rotatable with respect to said bearing, wherein each said pad includes a leading edge, a trailing edge, an active surface, and a trailing edge face, wherein said trailing edge face of each said pad includes a plurality of grooves formed therein.

14. The bearing according to claim 13 wherein said active surface of each said pad is further defined as being oriented in a plane that is generally perpendicular to an axis of rotation of said shaft.

15. The bearing according to claim 14 further comprising a second, third, and fourth spray bar engaged with said main body, wherein each said spray bar includes a plurality of apertures formed therein, wherein each said spray bar is in fluid communication with said channel, wherein said second spray bar is configured to direct a fluid flow toward said plurality of grooves in said trailing edge face of said second pad, wherein said third spray bar is configured to direct a fluid flow toward said plurality of grooves in said trailing edge face of said third pad, and wherein said fourth spray bar is configured to direct a fluid flow toward said plurality of grooves in said trailing edge face of said fourth pad.

16. The bearing according to claim 1 further comprising a plurality of apertures formed in said spray bar, wherein each aperture in said plurality of apertures is positioned to directly face at least one groove of said plurality of grooves.

17. A machine housing comprising:
a. a main body of a bearing having a channel formed therein, wherein said main body is engaged with said machine housing, wherein said main body is positioned around a shaft protruding from and rotatable with respect to said machine housing;
b. a first pad engaged with said main body, wherein said pad includes a leading edge, a trailing edge, and a trailing edge face, and wherein said first pad is moveable with respect to said main body in at least one dimension;
c. a plurality of grooves formed in said trailing edge face; and,
d. a spray bar engaged with said main body adjacent a trailing edge face of said first pad, wherein said spray bar is in fluid communication with said channel, wherein said spray bar includes an aperture that directly faces at least one groove of said plurality of grooves such that said aperture directs a fluid toward said plurality of grooves in said trailing edge face.

18. The machine housing according to claim 17 wherein said bearing further comprises a second, third, and fourth spray bar engaged with said main body, wherein each said spray bar includes a plurality of apertures formed therein, wherein each said spray bar is in fluid communication with said channel, wherein said second spray bar is configured to direct a fluid flow toward a plurality of grooves in a trailing edge face of a second pad, wherein said third spray bar is configured to direct a fluid flow toward a plurality of grooves in a trailing edge face of a third pad, and wherein said fourth spray bar is configured to direct a fluid flow toward a plurality of grooves in a trailing edge face of a fourth pad.

19. The bearing according to claim 18 further comprising a first, second, third, and fourth shank, wherein said first shank is engaged with said main body and in fluid communication with both said channel in said main body and said spray bar, wherein said second shank is engaged with said main body and in fluid communication with both said channel in said main body and said second spray bar, wherein said third shank is engaged with said main body and in fluid communication with both said channel in said main body and said third spray bar, and wherein said fourth shank is engaged with said main body and in fluid communication with both said channel in said main body and said fourth spray bar.

20. A method of increasing the amount of heat transfer, said method comprising the steps of:
a. forming a plurality of grooves in a trailing edge face of a pad, wherein said trailing edge face is defined by a direction of rotation of a shaft adjacent to and rotatable with respect to said pad;
b. positioning a spray bar adjacent said trailing edge face of said pad;
c. configuring an aperture in said spray bar;
d. directing a fluid flow having a plurality of predetermined fluid flow characteristics through said spray bar and out of said aperture toward said plurality of grooves, wherein said aperture is positioned to directly face at least one groove of said plurality of grooves, and wherein said fluid flow extracts heat from said pad.

\* \* \* \* \*